US 6,707,010 B2

(12) United States Patent
Kuenen

(10) Patent No.: US 6,707,010 B2
(45) Date of Patent: Mar. 16, 2004

(54) OVEN WITH FLUID JET DEVICE

(75) Inventor: Hendrikus Antonius Jacobus Kuenen, Overloon (NL)

(73) Assignee: Koppens B.V., Bakel (NL)

( * ) Notice: Subject to any disclaimer, the term of this patent is extended or adjusted under 35 U.S.C. 154(b) by 0 days.

(21) Appl. No.: 10/035,183

(22) Filed: Jan. 4, 2002

(65) Prior Publication Data

US 2002/0139789 A1 Oct. 3, 2002

(30) Foreign Application Priority Data

Jan. 5, 2001 (NL) .............................................. 1017040

(51) Int. Cl.[7] .............................. F27B 9/10; F27B 9/16; F27B 9/36; A21B 1/26; A21B 1/42
(52) U.S. Cl. ........................ 219/388; 219/400; 219/401
(58) Field of Search ................................. 219/388, 400, 219/401; 126/21 A, 20, 20.1; 99/443 C

(56) References Cited

U.S. PATENT DOCUMENTS

| 4,631,029 A | * | 12/1986 | Lanham et al. | ........... 126/21 A |
| 4,737,373 A | * | 4/1988 | Forney | ..................... 99/443 R |
| 5,078,120 A | * | 1/1992 | Hwang | ...................... 126/21 A |
| 5,189,948 A | * | 3/1993 | Liebermann | .............. 99/443 C |
| 5,243,962 A | * | 9/1993 | Hwang | ...................... 126/21 A |
| 5,407,692 A | * | 4/1995 | Caridis et al. | ............... 426/510 |
| 5,423,248 A | * | 6/1995 | Smith et al. | ............... 99/443 C |
| 5,666,876 A | * | 9/1997 | Vos | ........................... 99/443 C |
| 5,881,636 A | | 3/1999 | Sweet et al. | |
| 6,049,066 A | * | 4/2000 | Wilson | ....................... 219/400 |
| 6,065,463 A | | 5/2000 | Martin | |
| 6,138,660 A | * | 10/2000 | Middleton, Jr. | ........... 126/21 A |
| 6,259,064 B1 | * | 7/2001 | Wilson | ....................... 219/400 |
| 6,320,165 B1 | * | 11/2001 | Ovadia | ....................... 219/400 |

\* cited by examiner

*Primary Examiner*—Joseph Pelham
(74) *Attorney, Agent, or Firm*—Young & Thompson

(57) ABSTRACT

An oven which comprises a housing, a conveyor belt for guiding products through the interior space of the housing and heating elements for heating the products in the interior space of the housing using hot air and/or steam, which conveyor belt extends between an entrance and an exit of the housing and, between these two points, follows at least one path with turns which lie above one another. At least one air jet device is provided for generating a hot flow of air in jet form, which air jet device is positioned in such a manner with respect to at least one section of the conveyor belt that the hot flow of air in jet form impinges on the products situated on that section.

21 Claims, 3 Drawing Sheets

OVEN WITH FLUID JET DEVICE

The invention relates to an oven comprising a housing, a conveyor belt for guiding products through the interior space of the housing and heating means for heating the products in the interior space of the housing using a fluid, such as hot air and/or steam, which conveyor belt extends between an entrance and an exit of the housing and, between these two points, follows at least one path with turns which lie above one another.

An oven of this type is known from EP-A-558151 and is suitable for the complete or partial cooking of edible products. Examples of these products include meat products, such as chicken, hamburgers, cordon bleu and the like. The temperature and humidity can be set in such a manner that during the residence time in the oven, which is dependent on the length and velocity of the conveyor belt, the desired cooking can be effected.

For this purpose, the heating means comprise one or more fans and one or more air-heating elements. The fan sucks air out of the interior of the housing and blows it past the air-heating elements via an air duct. The heated air then flows along and between the turns on which the products are situated. This results in circulation of the air in the housing, which can be kept at the required temperature and humidity by suitable control means. Steam can also be used as the heating medium.

For certain products, it is desirable for the outer surface to be browned or made crispy. However, in the known oven it is not very easy to ensure an effect of this type, on account of the relatively uniform circulation of air in the housing. Therefore, it is an object of the invention to provide an oven of the type described above which allows the products to be browned more successfully and/or to be provided with a crispy crust. This object is achieved by the fact that at least one fluid jet device is provided for generating a hot flow of fluid in jet form, which fluid jet device is positioned in such a manner with respect to at least one section of the conveyor belt that the hot flow of fluid in jet form impinges on the products situated on that section.

BACKGROUND AND SUMMARY OF THE INVENTION

A fluid jet device of this type, which may be situated above straight and/or curved sections of the conveyor belt, delivers hot air jets which have a relatively high jet velocity. This jet velocity is considerably higher than the standard circulation velocity at which air circulates through the housing. The hot air jets come into contact with the products moving through beneath the air jet device, resulting in intensive heat transfer to the outer side of the product. This intensive heat transfer leads to a considerable rise in the temperature and drying on the outer side, resulting in browning and/or the formation of a crispy crust.

The fluid jet device can be arranged at various locations of the conveyor belt. However, a position above at least a section of the top turn of the conveyor belt and/or the straight conveyor-belt section which follows this turn is preferred. The advantage of this position is that the heating means which are responsible for supplying heated air are generally situated at the top in or on the housing. A further advantage of a high position is that there is less contamination of, inter alia, the fluid jet device. Nevertheless, the fluid jet device may also be arranged elsewhere, for example between the turns, if the heating means are in different, lower position.

The fluid jet device may comprise at least one jet nozzle for delivering a jet of hot fluid, such as hot air. The fluid jet nozzle may be in all kinds of forms, for example in sharp-edged form, in slot form, in the form of a circle, a quadrilateral, a star shape, etc. The fluid jet device preferably comprises a series of jet nozzles which may, for example, be circular in cross section. The fluid jet nozzles may be designed in the form of pipes, in the form of holes in a plate, etc. Moreover, the fluid jet nozzles may have a controllable or closeable passage.

The series of fluid jet nozzles may be arranged in a specific distribution. The distribution may be such that the sum of the surfaces of the nozzles which lie in the vicinity of the inner side of the curved series per unit surface area is greater than the sum of the surfaces of the nozzles which lie in the vicinity of the outer side of the curved series per unit surface area. As a result, in particular, of the curvature of the belt, the products, which are spread out at regular intervals over a straight conveyor-belt section when they enter the oven, are closer together at the inner side of the curved conveyor-belt section than at the outer side. The products which are closer together would be heated less well than the other products, but on account of the greater intensity of air jets on the inner side, this adverse effect can be avoided. Nevertheless, it is also possible to select a different distribution of the fluid jet nozzles. It will always be attempted to select this distribution in such a way that uniform browning/cooking of the products on the belt is achieved. If, for example, the browning of the products which lie on the outer circumference of the belt is inferior, the surface area of the jet nozzles on the outer side can be increased.

The differences in density of the series can be obtained, for example, by using larger air jet nozzles in the vicinity of the inner side. However, an embodiment in which the nozzles are identical and there is a shorter distance between the nozzles in the vicinity of the inner side of the curved series than in the vicinity of the outer side of the curved series is preferred. The series of nozzles may in this case comprise rows which extend transversely with respect to the direction of movement of the belt.

The fluid jet device may be designed in various ways, for example with sets of pipes which each open out into one or more fluid jet nozzles. However, an efficient, space-saving embodiment is obtained if the fluid jet device comprises at least one plate which extends above at least a section of the conveyor belt, which plate, on its side which is remote from the said conveyor-belt section, delimits a fluid duct and through which plate the at least one fluid nozzle passes. The hot air is forced outwards via the nozzles. In the plate, it is easy for the desired number of fluid jet nozzles to be arranged in a specific pattern.

The plate may extend over at least a section of the conveyor belt which runs in curved form in the path with turns which lie above one another, which plate comprises a series of jet nozzles which follows at least the curved section of the conveyor belt. Nevertheless, the plate may also extend over a straight conveyor-belt section.

The fluid duct is connected to a fan for forcing heated air and/or steam through the said fluid duct. The said fluid duct may, in a known way, be situated above the path with turns which lie above one another.

According to a preferred embodiment, the conveyor belt follows two paths with turns which lie above one another, the top turns of which paths are connected to one another via a straight, connecting conveyor-belt section and at least one of which paths is provided with a fluid jet device.

The two paths with turns which lie above one another are each situated in a separate zone with separate heating means and separate fluid jet devices.

In each zone, the fluid jet device is situated above the straight, connecting conveyor-belt section and the adjoining curved conveying section of the top turn. The zones are separated by means of a partition with a passage through which the straight, connecting conveyor-belt section extends.

In the oven according to the invention, the fluid flow naturally comes into contact first with the product which is situated on the conveyor belt. Then, some of the fluid will flow transversely through the conveyor belt. The conveyor belt is composed, in a known way, of a large number of wire links, and is therefore relatively highly permeable to the flow of fluid.

Consequently, the flow of fluid may also come into contact with the products on the lower sections of the conveyor belt. Since the fluid has by then already lost some of its heat and velocity, the problem may arise that the treatment of the products on these sections are more difficult to control.

In this context, it is possible to provide at least one shield which, with respect to the fluid jet device, is situated on the other side of the section of the conveyor belt, for the purpose of diverting the fluid originating from the fluid jet device towards at least one of the longitudinal edges of the section of the conveyor belt.

The fluid which has been diverted by the shield can then flow down past the turns and between them in the normal way. The shield preferably runs obliquely downwards, as seen in the direction of the outer contour of the conveyor belt.

BRIEF DESCRIPTION OF THE DRAWINGS

The invention will now be explained in more detail with reference to an exemplary embodiment which is illustrated in the figures, in which.

DESCRIPTION OF THE PREFERRED EMBODIMENTS

Figure 1:
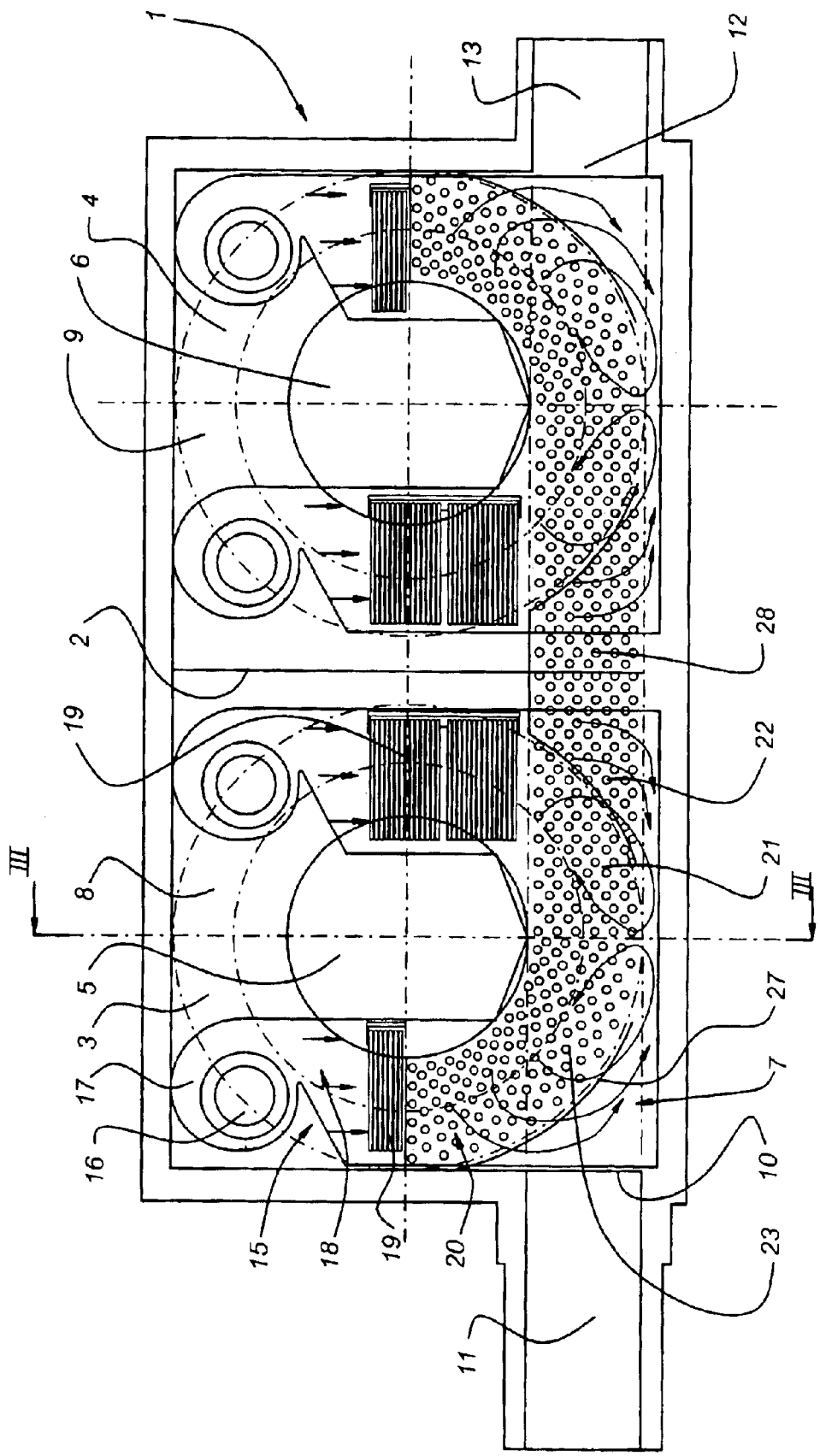
FIG. 1 shows a plan view of the oven according to the invention
Figure 2:
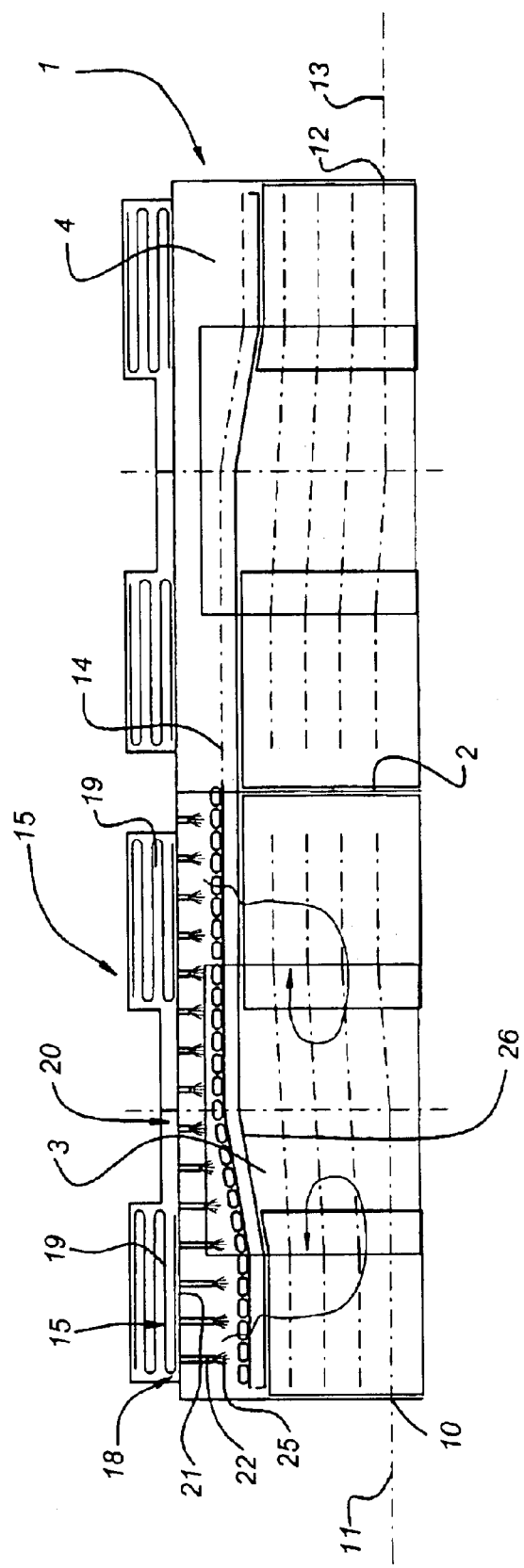
FIG. 2 shows a side view.
Figure 3:
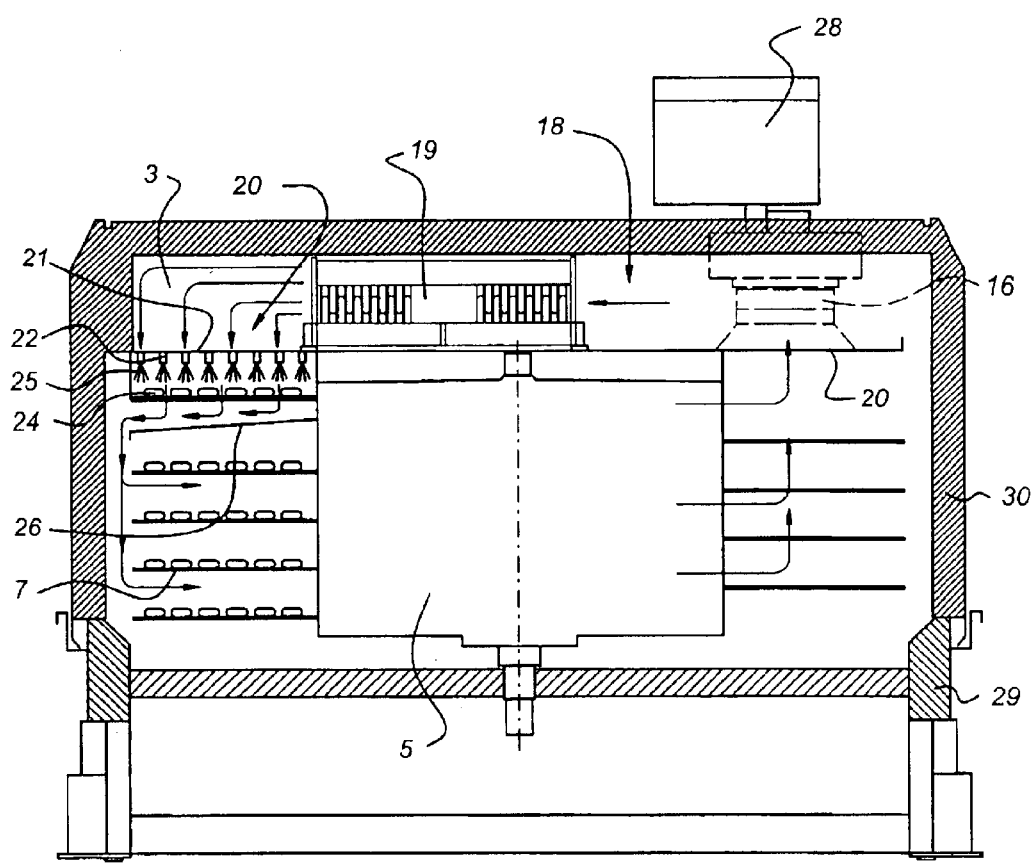
FIG. 3 shows the cross section III—III from FIG. 1

The oven according to the invention which is illustrated in FIGS. 1–3 comprises a housing, which is denoted overall by 1 and is divided into two chambers 3, 4 by means of a partition 2. A rotatable drum 5, 6 is arranged in each of these chambers, around which drum the conveyor belt 7 is guided along two helical paths 8 and 9, respectively.

The conveyor belt enters the oven via the entrance 10 by means of a straight conveyor-belt section 11 and leaves the oven via the exit 12, likewise by means of a straight conveyor-belt section 13. The two helical sections 8, 9 are connected by the straight conveyor-belt section 14, which lies at the top.

The heating means, which are denoted overall by 15, are arranged in the top of the housing. These heating means 15 comprise a fan 16 with a spiral casing, which opens out into the air duct, which is denoted overall by 18. The heating elements 19 are situated in this air duct 18.

The air is sucked up by the fan 16 at the bottom 20, as illustrated in FIG. 3, and is forced into the air duct 18 via the spiral casing 17. The air then flows past the heating elements 19 and then enters the section of the air duct 18 which, at the bottom, is delimited by the air jet device 20. This air jet device 20 comprises a plate 21 which bears a series of jet nozzles 22.

These jet nozzles 22 are situated directly above the curved conveyor belt section 23 of the top turn and also above the straight, connecting conveyor-belt section 14. The products which are situated on these conveyor-belt sections 14, 23 are exposed to hot air jets 25 which have a relatively high air velocity. As a result, these products are heated relatively strongly on their surface, so that good browning and, if appropriate, formation of a crispy crust is ensured.

At the level of these conveyor-belt sections 14, 25 there is formed, as it were, a zone which has different heating conditions from the remainder of the furnace (which therefore forms the other zone).

As shown in the embodiment illustrated in FIGS. 1 and 2, the air jet device 21 is situated over a quarter of the top turn of the two helical paths 8, 9 and over the straight connecting section 14 of the conveyor belt, which lies at the top. As a result, the products are exposed to the hot air jets for a certain time as they move through the housing 1, so that the desired effect is ensured.

Beneath the top conveyor-belt sections 14, 23 there is a shield plate 26, which prevents the products on the turn below from also being exposed to the direct influence of the hot air jets. This shield plate 26 diverts the hot air, in such a manner that it can flow over the turns in a controlled way. For this purpose, as shown in FIG. 1, curved vertical shield plates 27 are also provided, which shield a section of the helical paths 8, 9 on the outer side. As a result, the hot air is forced to flow in the direction of the arrows illustrated in FIGS. 1–3.

The air then flows back, over and between the turns situated at a lower level, to the inlet side 20 of the fan 16, in such a manner that continuous circulation is ensured. The fan is driven by an electric motor 28.

Although the figures show an oven with two helical paths, the invention can also be applied to ovens which have only one such path.

What is claimed is:

1. Oven comprising a housing (1), a conveyor belt (7) for guiding products through the interior space (3, 4) of the housing (1) and heating means (16–19) for heating the products (24) in the interior space (3, 4) of the housing (1) using a fluid, such as hot air and/or steam, which conveyor belt (7) extends between an entrance (10) and an exit (12) of the housing (1) and, between these two points, follows at least one path (8, 9) with turns which lie above one another,
   a straight section (11, 13, 14) of the conveyor belt (7) being connected to in each case top and bottom ones of said turns, and at least one fluid jet device (20) being provided for generating a hot flow of fluid (25) in jet form, which fluid jet device (20) is positioned above at least one of the said straight sections (11, 13, 14) in such a manner that the hot flow of fluid (25) in jet form impinges on the products (24) situated on that section.

2. Oven according to claim 1, in which the fluid jet device (20) is situated at least above a curved section (23) of the conveyor belt (7) in the path (8, 9) with turns which lie above one another.

3. Oven according to claim 2, in which the fluid jet device (20) is situated above at least a section (23) of the top turn of the conveyor belt (7).

4. Oven comprising a housing (1), a conveyor belt (7) for guiding products through the interior space (3, 4) of the housing (1) and heating means (16–19) for heating the products (24) in the interior space (3, 4) of the housing (1) using a fluid, such as hot air and/or steam, which conveyor belt (7) extends between an entrance (10) and an exit (12) of the housing (1) and, between these two points, follows at least one path (8, 9) with turns which lie above one another, at least one fluid jet device (20) being provided for generating a hot flow of fluid (25) in jet form, which fluid jet device (20) is positioned in such a manner with respect to at least one section of the conveyor belt (7) that the hot flow of fluid (25) in jet form impinges on the products (24) situated on that section, in which the fluid jet device (20) comprises at least one plate (21) which extends above at least a section of the conveyor belt (7), which plate (21), on its side which is remote from the said conveyor-belt section, delimits an air duct (18) and through which plate (21) at least one jet nozzle (22) passes that is arranged to jet air onto the at least one section of the conveyor belt, in which the fluid jet device (20) comprises a series of the jet nozzles (22), and in which the sum of the surfaces of the nozzles (22) which lie in the vicinity of the inner side of the curved series per unit surface area of the belt below is greater than the sum of the surfaces of the nozzles (22) which lie in the vicinity of the outer side of the curved series per unit surface area of the said belt.

5. Oven according to claim 4, in which the nozzles (22) are identical, and are at a shorter distance from one another in the vicinity of the inner side of the curved series than in the vicinity of the outer side of the curved series.

6. Oven according to claim 5, in which the series of nozzles (22) comprise rows which extend transversely to the direction of movement of the conveyor belt (7).

7. Oven comprising a housing (1), a conveyor belt (7) for guiding products through the interior space (3, 4) of the housing (1) and heating means (16–19) for heating the products (24) in the interior space (3, 4) of the housing (1) using a fluid, such as hot air and/or steam, which conveyor belt (7) extends between an entrance (10) and an exit (12) of the housing (1) and, between these two points, follows at least one path (8, 9) with turns which lie above one another, at least one fluid jet device (20) being provided for generating a hot flow of fluid (25) in jet form, which fluid jet device (20) is positioned in such a manner with respect to at least one section of the conveyor belt (7) that the hot flow of fluid (25) in jet form impinges on the products (24) situated on that section, in which the fluid jet device (20) comprises at least one plate (21) which extends above at least a section of the conveyor belt (7), which plate (21), on its side which is remote from the said conveyor-belt section, delimits an air duct (18) and through which plate (21) at least one jet nozzle (22) passes that is arranged to jet air onto the at least one section of the conveyor belt, in which the plate (21) extends over at least a section (23) of the conveyor belt (7) which runs in curved form in the path (8, 9) with turns which lie above one another, and the plate (21) comprises a series of jet nozzles (22), which series follows at least the curved section (23) of the conveyor belt (7), and in which there are heating means (19) in the air duct (18).

8. Oven according to claim 7, in which the air duct (18) is connected to a fan (16) for forcing heated air through the said air duct (18).

9. Oven according to claim 8, in which the air duct (18) is situated above the path (8, 9) with turns which lie above one another.

10. Oven according to claim 7, in which the heating means (19) extend to above the series of nozzles (22).

11. Oven comprising a housing (1), a conveyor belt (7) for guiding products through the interior space (3, 4) of the housing (1) and heating means (16–19) for heating the products (24) in the interior space (3, 4) of the housing (1) using a fluid, such as hot air and/or steam, which conveyor belt (7) extends between an entrance (10) and an exit (12) of the housing (1) and, between these two points, follows at least one path (8, 9) with turns which lie above one another, at least one fluid jet device (20) being provided for generating a hot flow of fluid (25) in jet form, which fluid jet device (20) is positioned in such a manner with respect to at least one section of the conveyor belt (7) that the hot flow of fluid (25) in jet form impinges on the products (24) situated on that section, in which the fluid jet device (20) comprises at least one plate (21) which extends above at least a section of the conveyor belt (7), which plate (21), on its side which is remote from the said conveyor-belt section, delimits an air duct (18) and through which plate (21) at least one jet nozzle (22) passes that is arranged to jet air onto the at least one section of the conveyor belt, in which the two paths (8, 9) with turns which lie above one another are each situated in a separate zone (3, 4) with separate heating means (19) and separate fluid jet devices (20), and in which in each zone (3,4) the fluid jet device (20) is situated above the straight, connecting conveyor-belt section (14) and the adjoining curved conveying section (23) of the top turn.

12. Oven according to claim 11, in which the zones (3,4) are separated by means of a partition (2) with a passage (28) through which the straight, connecting conveyor-belt section (14) extends.

13. Oven comprising a housing (1), a conveyor belt (7) for guiding products through the interior space (3, 4) of the housing (1) and heating means (16–19) for heating the products (24) in the interior space (3, 4) of the housing (1) using a fluid, such as hot air and/or steam, which conveyor belt (7) extends between an entrance (10) and an exit (12) of the housing (1) and, between these two points, follows at least one path (8, 9) with turns which lie above one another, at least one fluid jet device (20) being provided for generating a hot flow of fluid (25) in jet form, which fluid jet device (20) is positioned in such a manner with respect to at least one section of the conveyor belt (7) that the hot flow of fluid (25) in jet form impinges on the products (24) situated on that section, in which the fluid jet device (20) comprises at least one plate (21) which extends above at least a section of the conveyor belt (7), which plate (21), on its side which is remote from the said conveyor-belt section, delimits an air duct (18) and through which plate (21) at least one jet nozzle (22) passes that is arranged to jet air onto the at least one section of the conveyor belt, in which each path (8, 9) with turns which lie above one another is helical, and in which in each helical path (8,9) the conveyor belt runs around a rotatable drum (5,6) which can rotate about a vertical axis.

14. Oven comprising a housing (1), a conveyor belt (7) for guiding products through the interior space (3, 4) of the housing (1) and heating means (16–19) for heating the products (24) in the interior space (3, 4) of the housing (1) using a fluid, such as hot air and/or steam, which conveyor belt (7) extends between an entrance (10) and an exit (12) of the housing (1) and, between these two points, follows at least one path (8, 9) with turns which lie above one another, at least one fluid jet device (20) being provided for generating a hot flow of fluid (25) in jet form, which fluid jet device (20) is positioned in such a manner with respect to at least one section of the conveyor belt (7) that the hot flow of fluid (25) in jet form impinges on the products (24) situated on that section, in which the fluid jet device (20) comprises at least one plate (21) which extends above at least a section of the conveyor belt (7), which plate (21), on its side which is remote from the said conveyor-belt section, delimits an air duct (18) and through which plate (21) at least one jet nozzle (22) passes that is arranged to jet air onto the at least one section of the conveyor belt, and in which the housing (1) comprises a receptacle (29) and a cap (30), which cap (30) can be moved up and down with respect to the receptacle (29), between an open position and a closed position, by means of lifting members.

15. Oven according to claim 14, in which supporting legs are provided for the purpose of supporting the receptacle (29), and the lifting members are situated on the supporting legs.

16. Oven comprising a housing (1), a conveyor belt (7) for guiding products through the interior space (3, 4) of the housing (1) and heating means (16–19) for heating the products (24) in the interior space (3, 4) of the housing (1) using a fluid, such as hot air and/or steam, which conveyor belt (7) extends between an entrance (10) and an exit (12) of the housing (1) and, between these two points, follows at least one path (8, 9) with turns which lie above one another, characterized in that at least one fluid jet device (20) is provided for generating a hot flow of fluid (25) in jet form, which fluid jet device (20) is positioned in such a manner with respect to at least one section of the conveyor belt (7) that the hot flow of fluid (25) in jet form impinges on the products (24) situated on that section, in which the conveyor belt is permeable to a flow of fluid, and at least one shield (26, 27) is provided, which, with respect to the fluid jet device (20), is situated on the other side of the section of the conveyor belt (7), for the purpose of diverting the fluid originating from the fluid jet device towards at least one of the longitudinal edges of the section of the conveyor belt (7).

17. Oven according to claim 16, in which the shield (26, 27) is situated between two sections of the conveyor belt (7) which extend above one another.

18. Oven according to claim 16, in which the shield (26, 27) runs obliquely downwards, as seen in the direction of the outer contour of the conveyor belt (7).

19. Oven according to claim 16, in which the shield (26, 27) comprises a plate.

20. Oven according to claim 16, in which the shield (26, 27) is situated at least below a straight section (14) of the conveyor belt (7).

21. Oven according to claim 16, in which the shield (26, 27) is situated at least below a curved section (23) of the conveyor (7).

* * * * *